United States Patent [19]

Charette et al.

[11] Patent Number: 5,595,374

[45] Date of Patent: Jan. 21, 1997

[54] VARIABLE ELASTIC COUPLING ASSEMBLY FORMING SHOCK ABSORBER ATTACHMENT AND FILTERING BLOCK

[75] Inventors: Christian Charette, Yseure; Etienne de Fontenay, Decize, both of France

[73] Assignee: Caoutchouc Manufacture et Plastiques, Versailles, France

[21] Appl. No.: 408,083

[22] Filed: Mar. 23, 1995

[51] Int. Cl.⁶ .................. F16F 9/08; B60G 13/06
[52] U.S. Cl. .......... 267/220; 267/140.14; 280/693; 280/708
[58] Field of Search .......... 267/140.14, 140.15, 267/140.4, 141.1, 219, 220, 64.28; 188/299; 280/688, 693, 707, 709, 692, 708

[56] References Cited

U.S. PATENT DOCUMENTS

| | | | |
|---|---|---|---|
| 3,403,899 | 10/1968 | Plume | 267/35 |
| 4,161,304 | 7/1979 | Brenner et al. | 248/562 |
| 4,773,635 | 9/1988 | Buma | 267/220 |
| 5,180,144 | 1/1993 | Hellyer et al. | 267/64.28 |
| 5,267,726 | 12/1993 | Takeo et al. | 267/64.28 |

FOREIGN PATENT DOCUMENTS

| | | | |
|---|---|---|---|
| 0386735 | 9/1990 | European Pat. Off. | |
| 0392513 | 10/1990 | European Pat. Off. | |
| 2357790 | 2/1978 | France . | |
| 2572338 | 5/1986 | France . | |
| 2658887 | 8/1991 | France . | |
| 2671839 | 7/1992 | France | 267/220 |
| 3501260 | 7/1986 | Germany | 267/220 |
| 0179543 | 9/1985 | Japan | 267/220 |
| 0125905 | 6/1986 | Japan | 267/220 |
| 0125906 | 6/1986 | Japan | 267/220 |
| 62-56641 | 3/1987 | Japan . | |
| 62-215142 | 9/1987 | Japan . | |
| 62-270844 | 11/1987 | Japan . | |
| 0255110 | 10/1988 | Japan | 267/220 |
| 2-38729 | 4/1990 | Japan | 267/220 |
| 3288034 | 12/1991 | Japan . | |
| 4300710 | 10/1992 | Japan | 267/220 |
| 2188699 | 10/1987 | United Kingdom . | |

Primary Examiner—Robert J. Oberleitner
Assistant Examiner—Chris Schwartz
Attorney, Agent, or Firm—Young & Thompson

[57] ABSTRACT

A variable elastic coupling assembly interconnecting a rod of a vehicle shock absorber and a structure to be damped in order to filter vibrations, comprises two rigid annular armatures, one of which is fastened to the rod, and the other to the structure. The armatures are bonded together through at least two elastomeric annular elements which delimit between them a closed space which is totally sealed with respect to the external environment, and which contains a gas phase and at least one liquid phase. The volume of the closed space is modified by the deformation under strain of the elastomeric annular elements.

7 Claims, 5 Drawing Sheets

VARIABLE ELASTIC COUPLING ASSEMBLY FORMING SHOCK ABSORBER ATTACHMENT AND FILTERING BLOCK

BACKGROUND OF THE INVENTION

1. Field of the Invention

This invention relates to the field of elastic couplings which are used in suspensions, in particular the suspensions of vehicle wheels and engines. More particularly, it is an application of hydraulic and/or pneumatic damping to said elastic coupling when it is used as a suspension fastener between the rod of a vehicle shock absorber and the body of the vehicle.

2. Background Information

In any suspension system of a conventional drive train, when a spring provides the vertical flexibility, the pivoting is made possible by additional contact of a cup on a thrust ball bearing which transits the permanent load to the body. This additional fastening, like that of the shock absorber rod with which it is coaxial, requires a filtering which limits the vibrations transmitted via the spring. This function is very commonly performed by parts which are made of vulcanized rubber and which are intimately bonded to the cup and to the corresponding fastening ring.

The elastic parts which perform these functions have been the subject of numerous improvements, including the device disclosed by EP-A-0 249 369 (General Motors), which improves exclusively the elastic coupling between the shock absorber rod and the chassis, by limiting the dynamic deformations by means of thrust washers, while the end-of-stroke forces on a shock absorber stop must be exerted by means of another rigid cup, although this arrangement does not absorb the permanent load.

In an opposite manner, FR-A-2 583 126 (Honda) discloses a device which incorporates a roller thrust bearing to carry the permanent load of the suspension spring, but provides a good filtering of the acoustical vibrations only for the shock absorber rod, by means of a "vibration neutralizer".

On the other hand, the device which is disclosed in DE-A-3 034 743 (Continental) combines, in one complex part, permanent support—via a roller thrust bearing—of the suspension spring as well as the elastic spring where the connecting force is exerted, in dynamic alternation, between the shock absorber rod and the support on the body. In this design, the dynamic end-of stroke forces are exerted on the fastening of the shock absorber rod, as a result of the presence of a rubber stop, and not via the roller bearing, which supports a load which is not subject to a great deal of variation, because it is modulated exclusively by the flexibility of the spring, even in the event of rapid deflections.

In a similar manner, FR-A-2 563 302 (Volvo) discloses a device, called a MacPherson strut mount, in which a small space makes possible a short free displacement between stops, inside an upper fastening of the shock absorber rod, which also supports the permanent load of the spring.

Improvements which introduce a hydraulic damping at the upper fastening point of a shock absorber always relate to the attachment of the shock absorber rod and absorb the dynamic end-of-stroke force as a result of the impact of the tube of the shock absorber on an appropriate elastomer stop.

This method of improving vibratory comfort under the effect of wheel loads is disclosed in FR-A-2 587 774 and FR-A-2 623 866 (Tokai Rubber). These improvements are still applied exclusively to the connection between the shock absorber rod and the body, or a similar application. The device combines in one single part two opposite chambers connected by a liquid passage coiled around their outside diameter, a passage which is very long and has a significant cross section, and produces a major inertial effect, while the viscosity of the liquid contained in the passage does not act on the displacements.

These devices, the inertial effects of which block the deformation if the shock absorber exerts rapid forces, nevertheless make possible deflections in the event of slower movements thanks to the guidance provided either by a ring which, in the first document cited above, is concentric with the fastening, the elastomer of which is prestressed to improve its fatigue behavior, or, in the second document cited above, by an annular part with radial deflection.

The design of these devices is therefore very complex, although their single, very limited function is that of an elastic fastening point. The performance of the other functions also requires a similar level of complexity, to guarantee the uniformity of the level of quality required with regard to the filtering of noise and vibrations in the connections between the chassis and an automobile suspension system, as well as the gradual action required for the damping.

The analysis of the prior art shows that none of the devices of the prior art performs all of these functions satisfactorily or with simplicity, i.e. the improvement of the damping of vibrations of the vehicle's drive train and the gradual damping of the forces as a function of the displacement of the connection between the shock absorber rod and the vehicle chassis, while reducing the forces transmitted to said chassis by the vehicle drive train, while suppressing the impacts introduced, at the limits of deflection, by the displacement limiting devices, which most frequently generate annoyances caused by excessive noise, and by reducing the friction, which generates wear of the elastomer limit stops and thereby induces alterations of the performance of the elastic coupling.

Nor do any of the techniques used in the prior art make it possible to obtain, with a single device using simple means, a modulation not only of the dynamic characteristics, but also a modulation of the static rigidity and the damping action.

The invention is therefore a variable elastic coupling assembly, forming a shock absorber attachment and a filtering block, between the rod of a vehicle shock absorber and a structure to be damped. It consists of rigid annular armatures which are intimately bonded to a connecting assembly made of elastomer to delimit a closed space, containing a fluid used to fill the closed space, said variable elastic coupling assembly being rigidly linked on one hand to the rod of the shock absorber by means of an internal lower armature and an internal upper armature, and on the other hand to the structure to be damped by means of at least one upper armature.

The invention is characterized by the fact that the closed space is delimited by an assembly of upper annular armatures and/or an assembly of lower annular armatures, so that it can be completely sealed with respect to its external environment by the installation of plugs after filling, and by the fact that a modulation of the static and dynamic characteristics can be obtained by varying the composition of the fluid used to fill the closed space and/or of the volume of said closed space which, interacting with the elastomer compound connecting assembly, makes it possible on one hand to adapt the relative displacements of the components of the upper and lower annular armature assemblies, and of said elastomer compound connecting assembly, and on the other hand to filter the vibrations as a function of the requirements for a gradual damping action.

OBJECT OF THE INVENTION

In the variant realizations of the device which is the object of the invention, the closed space consists of a single annular chamber or a set of two, non-communicating annular chambers.

SUMMARY OF THE INVENTION

Depending on the applications, the fluid used to fill the closed space can consist of a gas, a homogeneous liquid or a mixture of liquids, which can be miscible of immiscible and have different viscosities, of a liquid in the presence of a gas, of a viscous material or of a viscous material in the presence of a gas.

The composition of the fluid used to fill the closed space makes it possible to modulate the static and dynamic rigidities, while its viscosity makes it possible to modulate the damping function.

To achieve the optimum adaptation to the requirements of the variable elastic coupling assembly, the closed space can include a system for the management of the fluid used to fill the closed space, which system consists either by a multi-position distributor, or in other variant realizations, by a direct control device, a control action which can be exerted by the loads of the shock absorber or by the loads of another mechanism which participates in the movement to be damped, in these latter cases constituting an active variable elastic coupling assembly.

To satisfy the requirements in the limit conditions of utilization, the variable elastic coupling assembly can include a stroke limit contact which consists of end stops made of an elastomer compound or another damping material, located on the upper annular armature assembly and or on the lower annular armature assembly.

BRIEF DESCRIPTION OF THE DRAWINGS

The variable elastic coupling assembly claimed by the invention, as well as variant realizations of the object of the invention, are explained in greater detail in the following description which corresponds to the accompanying drawings which illustrate individual realizations of the invention, in the form of non-restricting examples, and in which:

DESCRIPTION OF THE PREFERRED EMBODIMENT

Figure 1:
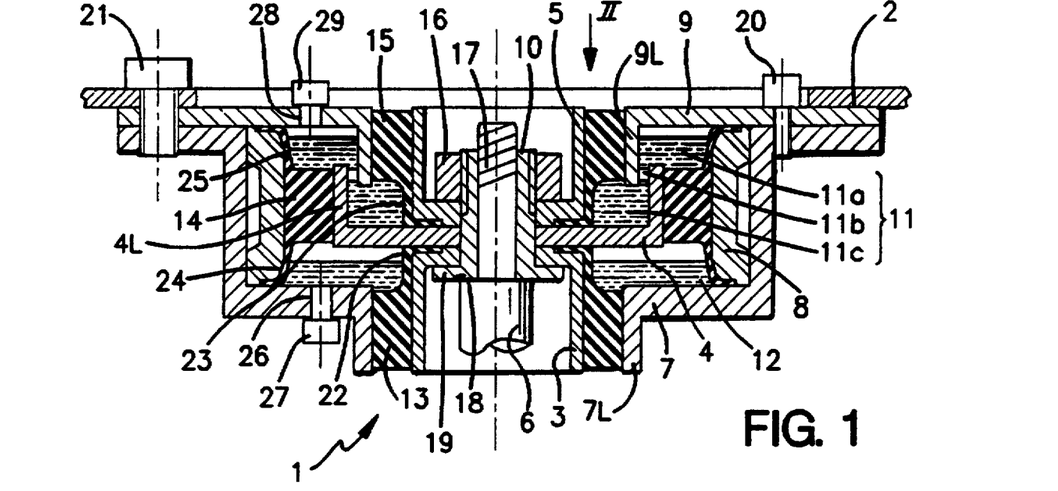
—FIG. 1 is an axial section of a variable elastic coupling assembly as claimed by the invention, which comprises a closed space consisting of two non-communicating annular chambers.
Figure 2:
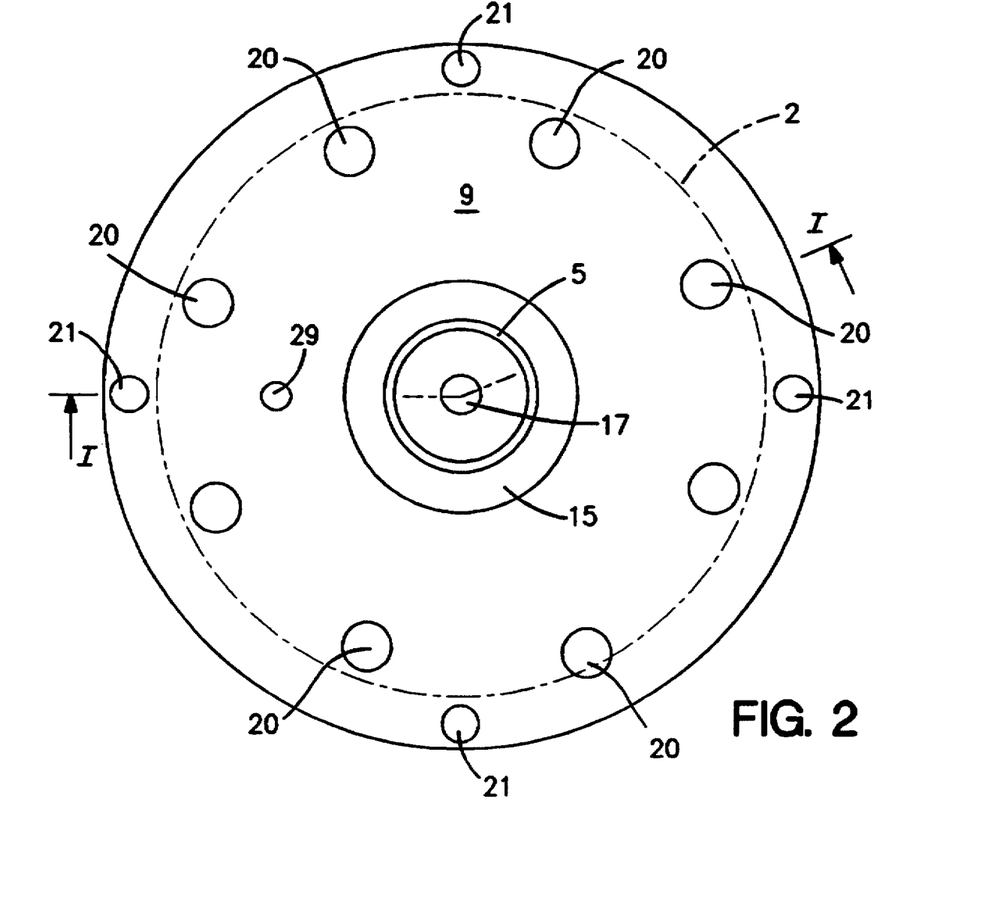
—FIG. 2 is an overhead view of the same variant.

FIG. 1 is a view in axial section of a variable elastic coupling assembly as claimed by the invention, forming an attachment of the shock absorber and a filtering block between a shock absorber (1) and a structure to be damped (2), such as the chassis of a vehicle for example, FIG. 2 being the corresponding overhead view from II.

The variable elastic coupling assembly is a revolving part which, in the illustrated variant, consists of an upper annular armature assembly (AS) and a lower annular armature assembly (AI), intimately linked to a connecting assembly made of elastomer compound (RE), to delimit a closed space which consists of an upper annular chamber (11) and a lower annular chamber (12).

The upper annular armature assembly (AS) is formed by an upper armature (9) in an L-shape and an internal connecting armature (4) in an L-shape which is reversed with respect to the upper armature (9); said upper and internal connecting armatures are intimately bonded by the external surface of their angular legs (91, 41), respectively to a surface of an upper elastic connecting element (15) and to a surface of an intermediate elastic connecting element (14), both of which are part of the elastomer compound connecting assembly (RE), to form the walls of the upper annular chamber (11).

In a similar manner, the lower annular armature assembly (AI) is formed by a lower armature (7) and the internal connecting armature (4); the lower armature (7) is bonded, by a surface of its extremity (71) to a surface of a lower elastic connecting element (13), which is a partial component of the elastomer compound connecting assembly (RE), to form, in association with the internal connecting armature (4) and the intermediate elastic connecting element (14), the walls of the lower annular chamber (12).

The upper annular chamber (11) and the lower annular chamber (12) must be totally sealed with respect to one another and with respect to their external environment, and define the closed space which contains a fluid used to fill the closed space.

The assembly thus constituted is installed so that it is blocked on one hand on the rod (6) of the shock absorber (1), and on the other hand on the structure to be damped (2).

In this realization, the lower annular armature assembly (AI) is connected to the rod (6) of the shock absorber (1) by means of a ring (10) which is fitted onto the extremity (17) of the rod (6) and is equipped with a collar (19) which is supported on a shoulder (18) of said rod (6) and on the internal lower armature (3), this ring (10) interacting with a nut (16) which blocks the assembly on the rod (6), being supported on the internal upper armature (5), the internal connecting armature (4) thus being tightened. The upper annular armature assembly (AS) has means for the assembly of its elements (20) and means (21) so that it can be fastened to the structure to be damped. The assembly and fastening means (20, 21) generally consist of screws or through bolts, the former connecting the lower armatures (7) and the upper armatures (9), which are enclosed by the internal connecting armature (4), and the latter making possible the connection to the vehicle.

The installation of said upper annular armature assembly (AS) is realized by means of an external connecting armature (8), the internal surface of which is intimately bonded to the external surface of the intermediate elastic connecting element (14), and the opposite surface of which is in local contact, via its extremities, with the internal surface of the lower armature (7).

The lower elastic connecting element (13) and the upper elastic connecting element (15) also have a sealing tab (22, 23) located between the internal connecting armature (4) on one hand, and the internal lower armature (3) or the corresponding internal upper armature (5) on the other hand, and the intermediate elastic connecting element (14) has two annular sealing tabs (24, 25), respectively located between the internal connecting armature (4) on one hand and the corresponding lower (7) or upper (9) armature on the other hand.

The upper annular armature assembly (AS) also includes, in this case, at least one plug (29), designed to contain the fluid used to fill the closed space in the upper annular chamber (11) and installed in the filling orifice (28) provided in the upper armature (9), while the lower annular armature assembly (AI) has at least one plug (27) designed to contain the fluid used to fill the closed space in the lower annular chamber (12) and installed in the filling orifice (26) provided in the lower armature (7).

It will be apparent to a technician skilled in the art that in other variants, the filling of the closed space can be realized by different means, such as the so-called "submarine" technique, or by the injection of fluid used to fill the closed space into the chambers by any appropriate technique, whereby said means may make the presence of the plugs (27, 29) unnecessary.

In the variant described, the upper annular chamber (11) is constituted by two half-chambers (11a, 11b) connected by a passage (11c) provided between the internal surfaces of the angular leg (91) of the upper armature (9) and the angular leg (41) of the internal connecting armature (4). This arrangement makes possible, between the walls of the upper annular chamber (11), an agitation of the liquid, under the dynamic load generated by the movements of the rod (6) of the shock absorber (11), an agitation which influences both the dynamic rigidity and the damping capacity of the device.

The selection of the geometric parameters of said passage (11c) between the upper armature (9) and the internal connecting armature (4) makes it possible to optimize said dynamic rigidity as a function of the requirements of the particular application, and the selection of the viscosity of the fluid used to fill the closed space makes possible an additional modulation of the damping effect.

The principle of operation of the variable elastic coupling assembly claimed by the invention is based on the transmission of the movements of the rod (6) of the shock absorber (1) via the internal lower armature (3), the internal connecting armature (4), and the internal upper armature (5) to the elastomer compound connecting assembly (RE), the lower (13), intermediate (14) and upper (15) elastic connecting elements which isolate the lower annular chamber (12) and the upper annular chamber (11) respectively, said annular chambers (11, 12) having no communication between them and containing a fluid used to fill the closed space which contains at least one viscous liquid or gas material, whereby said gas can be air. The plugs (27, 29) of the annular chambers (11, 12) seal the chambers from the external environment by closing the filling orifices (26, 28) which can be used to introduce the filling fluid into the closed space.

When the plugs (27, 29) have not been put in place or are not closed, the upper (11) and lower (12) annular chambers are filled with air at atmospheric pressure, and the device behaves, from the point of view of filtering and the damping of vibrations, like a device of the prior art in which the elastic connecting elements (13, 14, 15) are subjected to pure shear stress.

The resultant curve of the deflections as a function of the forces applied is then essentially linear, and the device does not have a deflection limit under the extreme stress conditions.

On the other hand if, as disclosed by the invention, the closed space is sealed from the external environment by plugging its filling orifices (26, 28) by means of the plugs (27, 29) of the lower (12) and upper (11) annular chambers respectively, and since there is no communication between the upper (11) and lower (12) annular chambers, the variable elastic coupling assembly behaves like a pneumatic elastic device when the fluid used to fill the closed space is a gas, like a hydroelastic device when the fluid used to fill the closed space is a liquid, or like a hydropneumatic elastic device when the fluid used to fill the closed space consists partly of a gas and partly of a liquid.

The modulation of the dynamic characteristics of the variable elastic coupling assembly claimed by the invention is obtained by the action of two parameters, taken separately or in combination, which are the type of fluid used to fill the closed space, by defining its density or its viscosity, and its composition, and more specifically, in the hydropneumatic version of the device, the relative volume proportions of the gas and of the liquid, whereby the distribution of said fluid used to fill the closed space in the two annular chambers (11, 12) can be identical or different.

In the variant illustrated in FIGS. 1 and 2, the closed space, consisting of the upper annular chamber (11) and the lower annular chamber (12) contains a fluid which is used to fill the closed space which consists of approximately 80% liquid in the upper annular chamber (11) and approximately 60% liquid in the lower annular chamber (12), the remainder of the volume of said chambers being occupied by a gas.

During the vertical displacement of the rod (6) of the shock absorber (1), whether in the ascending direction or in the descending direction, the behavior of the variable elastic coupling assembly claimed by the invention can be described by the following load phases:

First, under the effect of the displacement of the rod (6) of the shock absorber (1), the shear stress of the lower (13), intermediate (14) and upper (15) elastic connecting elements induces variations of the volume of the lower (12) and upper (11) annular chambers respectively, the one increasing in volume and the other decreasing in volume.

In the chamber, i.e. in the upper (11) or lower (12) annular chamber which undergoes a reduction in volume, the part of the fluid used to fill the closed space and in the gaseous state is compressed, while the part of the fluid in the liquid state is by definition incompressible; the compression of the gas creates a force which opposes the displacement of the rod (6) of the shock absorber (1), the intensity of which increases as a function of the volume of the annular chamber (11 or 12).

The force-deflection law which results is inflected significantly with respect to the linear deformation described above for the device whose annular chambers are in communication with the atmosphere, corresponding to an increasing and gradual rigidification, the gradual nature of said change being one of the essential characteristics of the variable elastic coupling assembly.

The increasing compression in the annular chamber (11 or 12) causes, via the intermediary of the incompressible fluid used to fill the closed space, the deformation of the lower (13) or upper (15) elastic connecting element in question and of the intermediate elastic connecting element (14); the force opposing the displacement of the rod (6) of the shock absorber then assumes an intensity which is essentially equal to the force to be exerted to deform said elastic connecting elements, a force which is much greater than that generated by their shear stress. The result is a substantial increase of the rigidification of the variable elastic coupling assembly.

Figure 3:
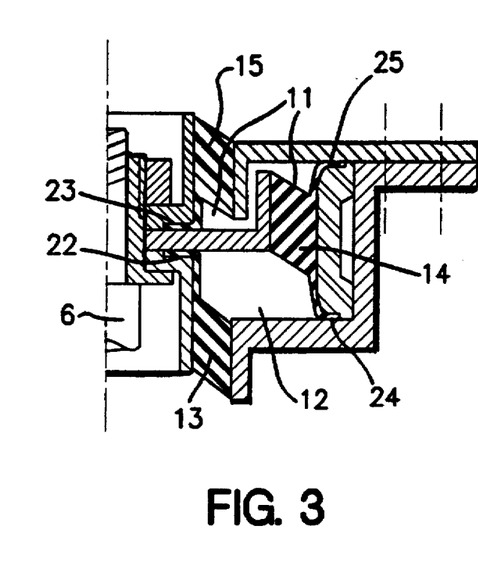
—FIG. 3 is a partial section of the variable elastic coupling assembly, in a pneumatic version, i.e. in which the fluid used to fill the closed space in the closed space consists of a gas, and illustrates the behavior of the device in deflection.

FIG. 3 is a partial cross section of the variable elastic coupling assembly according to the invention, wherein the closed space is constituted by an upper annular chamber (11) and a lower annular chamber (12); in the illustrated variant, the two annular chambers (11 and 12) are filled with a gaseous fluid, e.g. with air or nitrogen. The figure thus illustrates the behavior in deflection of the device in its pneumatic version.

The upper elastic connecting element (15), which is equipped with its sealing tab (23), the intermediate elastic connecting element (14) equipped with its two lower (24) and upper (25) annular lower sealing tabs and the lower elastic connecting element (13), equipped with its sealing tab (22), have, at rest, i.e. in the absence of loads, an essentially parallelepiped shape. Under the effect of the forces applied, the relative movement of the components of the upper annular armature assembly (AS) and of the lower annular armature assembly (AI) imposes on the components of the elastomer compound connecting assembly (RE), a shear deformation which results in an essentially rhomboid-shaped cross section which is characteristic of this type of deformation.

If the plugs (27, 29) of the upper (11) and lower (12) annular chambers are not installed in the corresponding filling orifices (26, 28) or are not closed, said annular chambers (11 and 12) are filled with air at atmospheric pressure since they are in communication with the exterior. The variable elastic coupling assembly is then composed, from the point of view of the filtering, like a device of the prior art in which the elastic coupling elements are loaded with pure shear stress, the response of the system is translated by a direct proportionality of the forces as a function of the deflections.

On the other hand, when, as disclosed by the invention, the annular chambers (11, 12) containing gas are isolated in a sealed manner from the exterior environment by the installation and tightening of the plugs (27, 29), the variable elastic coupling assembly behaves, from the point of view of filtering, as a pneumatic elastic device; in this case, the effect of a displacement of the rod (6) of the shock absorber (1), results in a displacement of the lower (13), intermediate (14) and upper (15) elastic connecting elements forming the elastomer compound connecting assembly (RE), which induces a variation of the volume of the annular chambers (11, 12). The volume of the upper annular chamber (11) is reduced as the volume of the annular chamber (12) is increased when the rod (6) of the shock absorber (1) executes an ascending movement, while the evolution of the volume of the annular chambers (11, 12) is in the opposite direction when the rod (1) of the shock absorber makes a descending movement.

In the upper annular chamber (11), for example, in the case of an ascending movement of the rod (6) of the shock absorber (1), whereby the volume of the annular chamber is reduced, the gas is compressed, inducing a force which opposes the displacement.

The result is an increase in the rigidity, until the compression reaches a value which is sufficient to cause, as illustrated, the deformation of the upper (15) and intermediate (14) elastic connecting elements which constitute the deformable part of said upper annular chamber (11), inducing an increase in the rigidity.

The effect of the corresponding increase in the volume of the lower annular chamber (12) has not significant influence on the behavior of the variable pneumatic elastic coupling assembly thus constituted.

Figure 4:
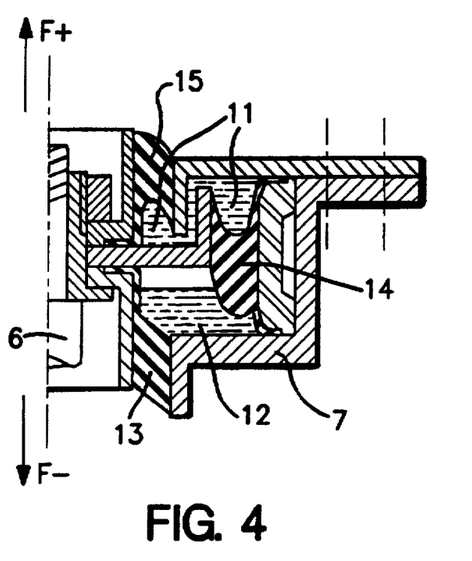
—FIG. 4 is a view in partial section of another variant of the variable elastic coupling assembly, with two non-communicating annular chambers, in the version consisting of a variable hydropneumatic elastic coupling assembly, i.e. in which the fluid used to fill the closed space consists of a liquid or another viscous material in the presence of a gas; the figure illustrates the deflection behavior of the device.

FIG. 4 is a partial section of another variant of the variable elastic coupling assembly, with two non-communicating chambers (11, 12), in the version constituting a hydropneumatic elastic coupling assembly. It illustrates the behavior of the device under load.

In the illustrated variant, the upper annular chamber (11) is practically filled with a liquid, while the lower annular chamber (12) contains a fluid filling the closed space which consists of a liquid and a gas.

Since the liquid in the upper annular chamber (11) is, by definition, incompressible, the only role which could be played by said annular chamber (11) would be that of providing variable damping as a function of the viscosity of the liquid, with a high static rigidity, the lower annular chamber (12) essentially playing a filtering role during the descending movements of the rod (6) of the shock absorber (1). In contrast to this version, which results in a high dynamic rigidity during the ascending movements, preference is generally given to a version in which the two annular chambers (11, 12) contain a fluid which is used to fill the closed space and which is composed of both liquid or a viscous material and gas, even if the proportion of gas by volume is low.

In the illustrated variant, which is representative of a deformation resulting from an ascending movement of the rod (6) of the shock absorber, the volume of the upper annular chamber (11) is reduced under the effect of the shear forces applied and of the deformation of the elastic connecting elements (14, 15) in question, which assume a cross section essentially in the shape of rhomboid. The compression force which results is transmitted by the liquid phase of the fluid used to fill the closed space to the deformable elements of the walls of said upper annular chamber (11), i.e. the upper (15) and intermediate (14) connecting elements, resulting in an additional deformation of said connecting elements (14, 15), which is translated by a the formation of a hollow in the lower surface of the upper elastic connecting element (15) and of the upper surface of the intermediate connecting element (14), and on account of the incompressibility of the elastomers, by a bulging of the opposite faces of said elastic connecting elements (14, 15).

The bulging of the lower surface of the intermediate elastic connecting element (14) can be used as a limit stop, because when the elastomer compound connecting assembly (RE) is deformed under the action of major stresses, said bulging of the lower surface of the intermediate elastic connecting element (14) can come into contact with the part of the lower armature (7) which forms the bottom of the lower annular chamber (12) and thus limits the deformations.

Figure 5:
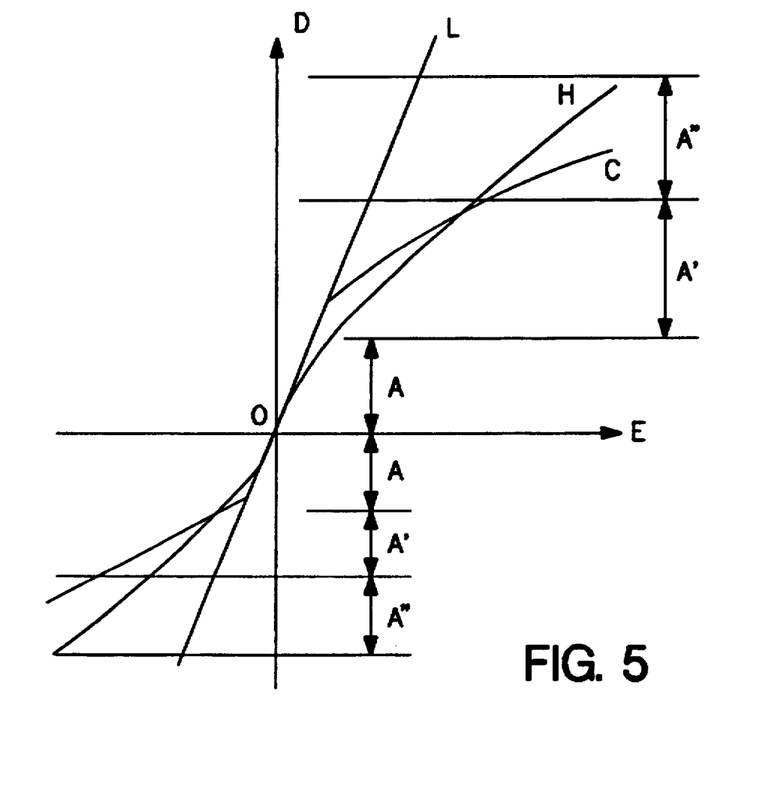
—FIG. 5 illustrates, in the form of a diagram, the variation of the deflections as a function of the forces applied, for a variable hydropneumatic elastic suspension assembly, compared to devices of the prior art.

FIG. 5 illustrates, in the form of a diagram, the variation of the deflections of the device as a function of the forces applied, for a variable elastic coupling assembly of the hydropneumatic type, i.e. in which each of the annular chambers (11, 12) is filled with a fluid which fills the closed space and consists of a gas and a liquid.

The figure presents a comparison between the behavior of the variable elastic coupling assembly according to the invention, and described by the curve (H), with that of a conventional elastic coupling—consisting of elements which are made of elastomer compound, relatively flexible, with low hysteresis and intimately bonded to metal armatures which limit the deflections—described by the curve (C) and with which a device with two annular chambers, having a structure similar to that of the invention, but in which said annular chambers are left open, in communication with the exterior environment, thereby not adding any pneumatic effect, an action which is described by the curve (L).

The diagram in FIG. 5 shows, for each type of device, the variation of the deflections plotted on the ordinate axis (OD), as a function of the forces plotted on the abscissa (OE). Three zones, which are symmetrical to the abscissa (OE) can be distinguished, in the vicinity of the deflections, according to the behavior of the devices as a function of the stresses:
—in the vicinity of the origin, the zones (A) correspond to low-amplitude deflections such as would be generated by a relatively well-maintained road which has a good quality paving;
—the zones (A') are transitional zones corresponding to medium-amplitude deflections such as would be generated by normal driving conditions;
—the zones (A") correspond to major deflections, positive or negative, produced when the can runs over obstacles, generating impacts and rebounds.

In the zones (A), the low-amplitude deflections are essentially proportional to the forces and the response is almost the same a if the elastic coupling were provided by a conventional device, a device with annular chambers in communication with the atmosphere or by a variable elastic coupling device as claimed by the invention. The curves (C, L and H) are therefore essentially superimposed in these zones.

In the transitional zones (A') which are representative of the most common driving conditions, the device which has annular chambers in communication with the atmosphere offers practically no filtering, and the deflections remain essentially proportional to the forces. The conventional elastic couplings, for their part, have a filtering effect, and the curve (C) of the deflections as a function of the forces is significantly inflected, with a sudden change of slope, these phenomena generating noises and friction, and therefore annoyance and wear.

On the other hand, the variable elastic coupling assembly according to the invention behaves as indicated by the curve (H) which changes slope only very gradually between the zones (A) and (A'), whereby the filtering does not occur all at once, and thus without any annoyance.

In the regions of strong positive or negative deflections, i.e. in the zones (A") corresponding to the phenomena, respectively, of impacts for positive deflections and rebounds for negative deflections, the elastic coupling devices which have annular chambers which are in communication with the atmosphere do not have, as shown by the curve (L) in said regions, either filtering or limitation of deflection or saturation, and the deflections remain, as in the zones (A) and (A'), proportional to the forces.

On the other hand, the conventional type elastic couplings combine a proper filtering action with a limitation of deflections by means of the connection of the elastomer to the metal, possibly supplemented by a limiting device, just like the variable elastic coupling device of the invention, the effectiveness of which is improved in this range thanks to the gradual nature of the actions.

The modulation of the static and dynamic rigidities which is an essential characteristic of the invention is governed by the type of fluid used to fill the closed space, i.e. the composition of the fluid used to fill the closed space.

The distribution of the closed space between the upper (11) and lower (12) annular chambers can be identical or different, depending on whether the desired behavior, as a function of the direction of displacement of the rod (6) of the shock absorber (1) is a symmetrical or asymmetrical behavior of the variable elastic coupling assembly of the invention.

To demonstrate the possibilities of varying the characteristics, an analysis was conducted of the influence of the composition of the fluid used to fill the closed space on the static rigidity (Ks) or quasi-static rigidity (at low frequencies) of the variable elastic coupling assembly of the invention.

The results are presented in Table 1 below, where the values of the static or quasi-static rigidity correspond to the zones (A) of the diagram in FIG. 5.

They are supplemented by the limitations of deflections to approximately 1000 daN, corresponding to the zones of high loads of zones (A") of the same diagram.

TABLE 1

Static rigidity as a function of the composition of the fluid used to fill the closed space

| Fluid used to fill the closed space | | Static rigidity | Limitation of deflections |
|---|---|---|---|
| % gas | % liquid | daN/mm | mm at 1000 daN |
| 100 | 0 | 50 | none |
| 60 | 40 | 58 | none |
| 40 | 60 | 60 | ±10 |
| 25 | 75 | 70 | ±8.5 |
| 10 | 90 | 80 | ±6.5 |
| 0 | 100 | 340 | ±3.5 |

The result is that the increase in the proportion of liquid in the fluid used to fill the closed space makes it possible to control in a very precise fashion the static rigidity between the pneumatic version of the device and the hydropneumatic version, in which the fluid used to fill the closed space consists of 60% liquid and 40% gas, whereby the static rigidity under these conditions increases from 50 to 60 daN/mm, while if the designer wishes to achieve significant variations of static rigidity, the composition of the fluid used to fill the closed space has a much greater influence between 75% and 100% liquid, while the static rigidity then varies from 70 daN/mm to 340 daN/mm.

Moreover, it is frequently necessary to obtain an increase in the rigidity in the direction of large forces, to limit the deflections of the rod of the shock absorber, forces corresponding to the zones (A") of the diagram in FIG. 5. In conventional systems, this limitation of deflections is achieved by mechanical stops, while in the invention, this function is performed by the compression of the fluid used to fill the closed space, and is made variable by the composition of said fluid, since it varies from q 20 millimeters for 40% gas and 60% liquid to q 3.5 millimeters for 100% liquid. The limitation of the deflections in the variable elastic coupling assembly of the invention is therefore done without mechanical contact, and therefore without excess annoyance caused by noise and without the risk of wear.

An additional advantage of the invention resides in the possibility of adjusting the dynamic rigidity both by the selection of the composition of the fluid used to fill the closed space and also by the internal geometry of the closed space of the variable elastic coupling assembly, which, by agitation and more or less great shear loads exerted on the fluid used to fill the closed space, modifies the values of the dynamic rigidity as a function of the frequency values.

Table 2 below shows the results in terms of dynamic rigidity (Kd) expressed in Newtons/millimeter, obtained as a function of the frequency, on a dynamic test machine, where the dynamic amplitude is q 0.05 millimeters, for a variable elastic coupling assembly having a closed space of approximately 150 cm3 with two types of filling, i.e. 10% air and 90% liquid, and with 100% liquid, respectively, compared to a "reference" system, i.e. a system of the conventional type in which the annular chambers constituting the closed space are left open and in communication with the atmosphere; in the cited example, the device has an upper annular chamber (11) which has a volume of 80 cm3 and a lower annular chamber (12) which has a volume of approximately 70 cm3.

TABLE 2

Dynamic rigidity as a function of the frequency for different compositions of the fluid used to fill the closed space

| Frequency | Reference | Type of filling Variable elastic connecting assembly | | | |
|---|---|---|---|---|---|
| | 100% gas open chambers | 10% gas 90% liquid variation | | 100% liquid variation | |
| Hertz | Kt (N/mm) | Kd1 | Kd1/Kt | Kd2 | Kd2/Kt |
| 2 | 650 | 1050 | 1.6 | 3660 | 5.6 |
| 20 | 682 | 1145 | 1.7 | 3827 | 5.6 |
| 50 | 701 | 1155 | 1.6 | 3914 | 5.6 |
| 100 | 725 | 1040 | 1.4 | 3990 | 5.5 |
| 150 | 755 | 850 | 1.1 | 4010 | 5.3 |
| 200 | 800 | 800 | 1.0 | 4100 | 5.1 |

Table 2 shows that in a conventional elastic coupling, in which the chambers are in communication with the atmosphere, and in which the static rigidity is 50 daN/mm, the dynamic rigidity (Kt) varies only from 650 N/mm at low frequencies to 800 N/mm at 200 Hz, while a variable hydropneumatic coupling assembly, in which the fluid used to fill the closed space is composed of 10% gas and 90% liquid, and in which the static rigidity is 200 daN/mm, has a dynamic rigidity at least 1.4 times higher up to 100 Hz, and tends to approach that of the conventional elastic coupling for higher frequencies. This version of the device, for a static rigidity higher than that of the conventional device, and improving the handling of the vehicle, consequently makes it possible to have an equivalent dynamic rigidity and of a limited value in the range of the high frequencies corresponding to the acoustical frequencies. Thus it is possible to achieve the best compromise between road handling and acoustical comfort.

The hydraulic elastic coupling assembly, the closed space of which is completely filled with liquid, and the static rigidity of which is 340 daN/mm, has for its part, in the entire range of frequencies, a dynamic rigidity which is more than 5 times greater than the conventional elastic coupling.

This capability of varying the static and dynamic rigidities can turn out to be very advantageous because, for dynamic rigidities which are relatively close to acoustical frequencies on the order of 150 Hz, it is possible to modulate, depending on the specific requirements, the static rigidities of the variable hydropneumatic elastic coupling between 50 daN/mm and 80 daN/mm, which makes it possible to regulate a suspension which has a more or less firm action, without generating excessive acoustical annoyance, simply by varying the proportion of liquid, between 0% and 80%, in the fluid used to fill the closed space.

To this modulating effect of the static and dynamic rigidities, it is possible to add a damping effect, by using a viscous material as part or all of the fluid used to fill the closed space, whereby said damping can also be modulated by the selection of the viscosity of the component and of its proportion in the fluid used to fill the closed space.

The fluid used to fill the closed space can consequently, and depending on the variants of the variable elastic coupling assembly, consist of a gas alone, of a gas in the presence of a liquid, of a liquid alone—homogeneous or composed of a mixture of two miscible or immiscible components of different viscosities—or a viscous material alone or of a viscous material in the presence of a gas.

Figure 11:
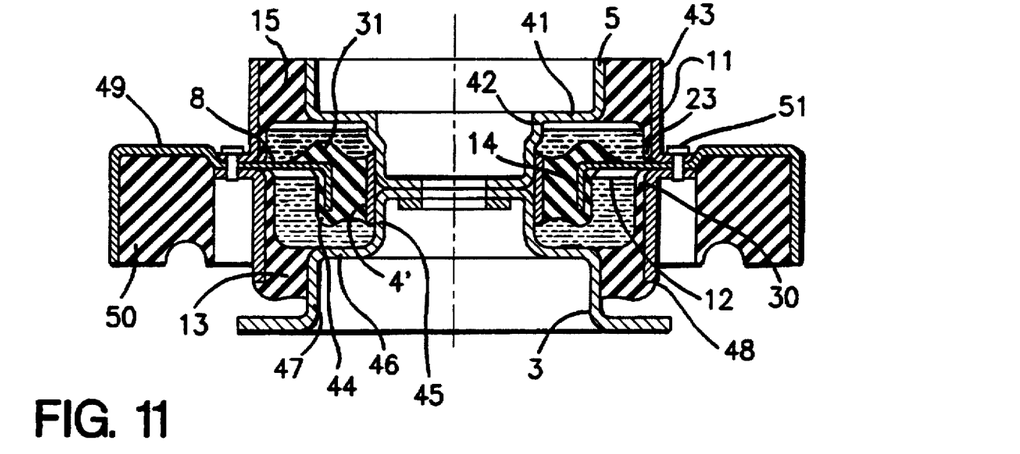
—FIG. 11 illustrates another specific layout of the variable elastic coupling assembly in which there is an exterior filling element made of elastomer compound.
Figure 12:
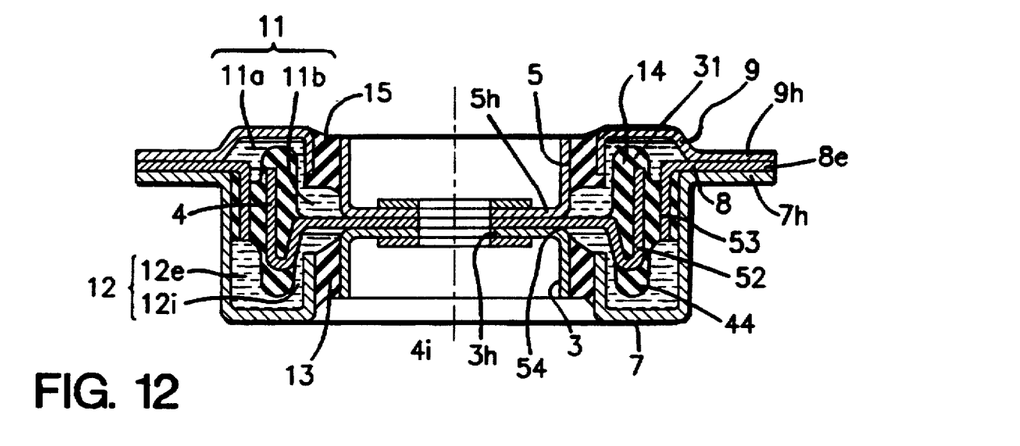
—FIG. 12 illustrates a variant of the variable elastic coupling assembly in a hydropneumatic version.
Figure 13:
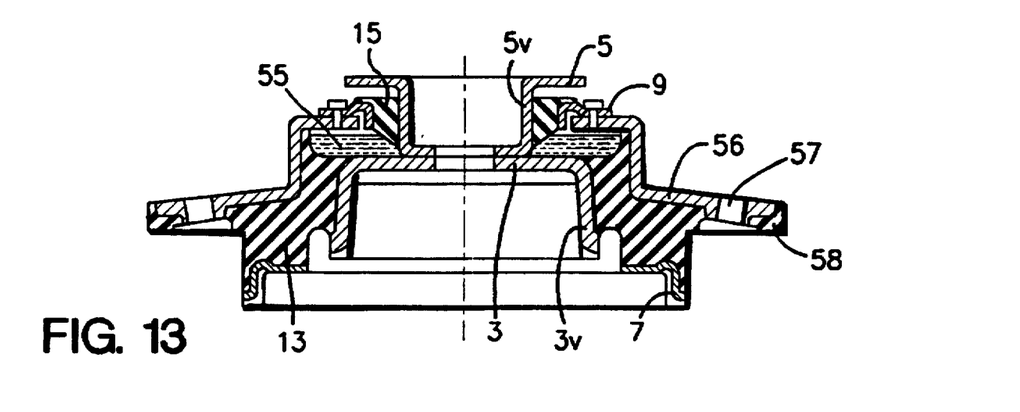
—FIG. 13 discloses a simplified variant of the variable elastic coupling assembly, in a hydropneumatic version, in which the closed space consists of a single annular chamber.

FIGS. 6 to 12 illustrate different variants of the variable elastic coupling assembly where the closed space consists of an upper annular chamber (11) and a lower annular chamber (12), and FIG. 13 illustrates a simplified variant in which the closed space consists of a single annular chamber. These variants have different configurations, or have additional components which will be described in detail, but all of which behave with the operating mechanism explained above and are suitable for modulating static and dynamic rigidities, and for damping modulations, by the means described.

Figure 6:
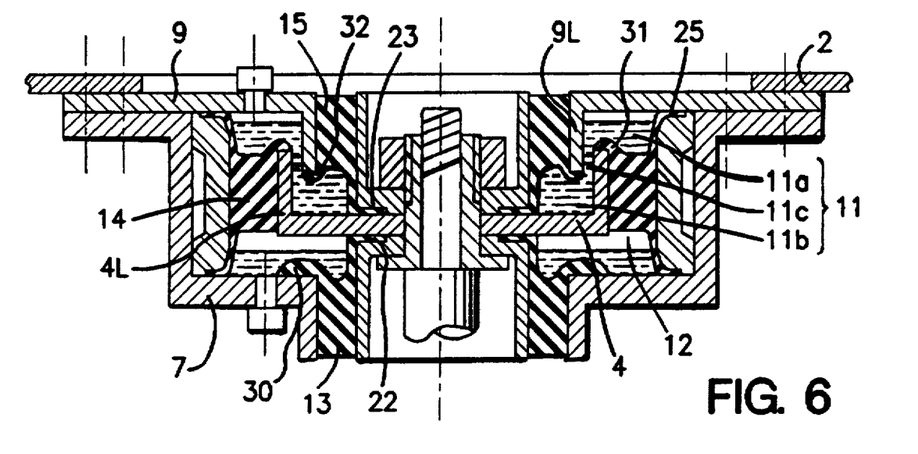
—FIG. 6 shows, in an axial section of a hydropneumatic variant of the variable elastic coupling assembly, the presence of limit stops made of elastomer compound.

FIG. 6 shows, in the form of an axial section of a hydropneumatic variant of the variable elastic coupling of the invention, the presence of limit stops made of elastomer compound.

The variant shows a structure similar to that of FIG. 1, composed of an upper annular armature assembly (AS), and a lower annular armature assembly (AI), whereby the fluid used to fill the upper (11) and lower (12) annular chambers consists of liquid and gas.

This figure therefore also relates to a variable elastic coupling assembly in a hydropneumatic version.

In the illustrated variant, the lower (13), intermediate (14) and upper (15) elastic connecting elements each have a limit stop made of elastomer compound, respectively designated (30), (31) and (32). The role of said limit stops (30, 31, 32) is to intervene as a limit stop to limit the deflections in the event of major forces generated by rebounds or impacts.

Under these circumstances, when the elastic connecting elements (13, 14, 15) have been deformed after the variation of the volume of the upper (11) and lower (12) annular chambers, the limit stop (30) of the lower elastic connecting element (13) which is intimately bonded to the lower armature (7) comes into contact with the lower surface of the internal connecting armature (4), the upper limit stop (31) of the intermediate elastic connecting element (14) which, for its part, is intimately bonded to the peak of the annular leg (41) of the internal connecting structure (4), comes into contact with the internal surface of the upper armature (9) and the lower limit stop (32) of the upper elastic connecting element (15), which is intimately bonded to the extremity of the angular leg (91) of the upper armature (9), for its part, comes into contact with the upper surface of the internal connecting armature (4).

The limit stops (30, 31, 32) are therefore integral parts of the lower (13), intermediate (14) and upper (15) elastic connecting elements respectively. The limit stop (30) of the lower elastic connecting element (13) is located on the surface which forms the bottom of the lower annular chamber (12) and is located opposite the sealing tab (22).

In a similar manner, the upper intermediate limit stop (31) is located on the intermediate elastic connecting element (14) which forms the bottom of the upper half-chamber (11a) of the upper annular chamber (11) and the opposite the upper sealing tab (25), and the limit stop (32) is located on the surface of the upper elastic connecting element (15) which forms the upper wall of the lower half-chamber (11b) of the upper annular chamber (11) and opposite the sealing tab (23). The stroke limiting contact occurs between the limit stop (30) and the lower surface of the internal connecting armature (4), or between the lower intermediate limit stop (32) and the upper surface of the internal connecting armature (4), or between the upper limit stop (31) and the lower surface of the upper armature (9).

The arrangement of the upper annular chamber (11) in two upper (11a) and lower (11b) half-chambers makes possible, via the passage (11c), an agitation of the liquid contained in said upper annular chamber (11), which in turn makes it possible to reduce the dynamic rigidification of the variable elastic coupling assembly. Of course, such an effect can be obtained only in the hydropneumatic or hydroelastic versions of the device.

The selection of the geometric parameters of said passage (11c) between the upper half-chamber (11a) and the lower half-chamber (11b) makes it possible to modulate the effect of the reduction of the dynamic rigidification, and by means of a judicious selection of the viscosity of the fluid used to fill the closed space, to also modulate the additional damping effect.

Figure 7:
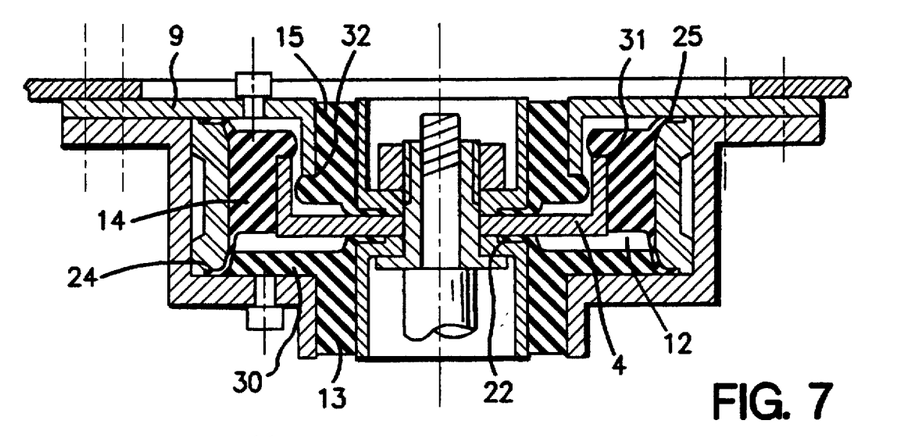
—FIG. 7 shows, also in an axial section, another variant of the variable elastic coupling assembly, in a pneumatic version, comprising two non-communicating annular chambers, a small closed space and limit stops made of elastomer compound.

FIG. 7 shows, also in an axial section, another variant of the variable elastic coupling assembly, in a pneumatic version, comprising two annular chambers having a reduced volume and elastomer compound end stops.

The structure of the device is similar to the device illustrated in FIG. 1, and has the same components, forming an upper annular armature assembly (AS) and a lower annular armature assembly (AI); the closed space is significantly smaller than in the variants described above, since the lower (13) and intermediate (14) elastic connecting elements are much more voluminous.

In this variant, the limit stop (3) supported by the lower elastic connecting element (13) consists of a significant thickening of the elastomer compound. In this case, therefore, the walls of the lower annular chamber (12) are constituted partly by the lower surface of the internal connecting armature (4) and by the lower surface of the intermediate elastic connecting element (14), in the upper part, the other three walls being formed by elastomer compound elements, i.e. the lower sealing tab (24) of the internal connecting armature (4), the limit stop (30) and the sealing tab (22) supported by the lower elastic connecting element (13).

In this case, the fluid used to fill the closed space is constituted by a gas, and the variable elastic coupling assembly functions by the pneumatic effect combined with the elastic effect produced by the deformation of the elastic connecting elements (13, 14, 15) which constitutes the elastomer compound connection (RE).

In the event of rebound or impact loads, the limitation of the relative displacements occurs by means of a limiting contact, in the lower annular chamber (12), between the limit stop (30) and the lower surface of the internal connecting armature (4) or, in the upper annular chamber (11), either between the upper limit stop (31) and the internal surface of the upper armature (9), or between the limit stop (32) and the upper surface of the internal connecting armature (4).

Figure 8:
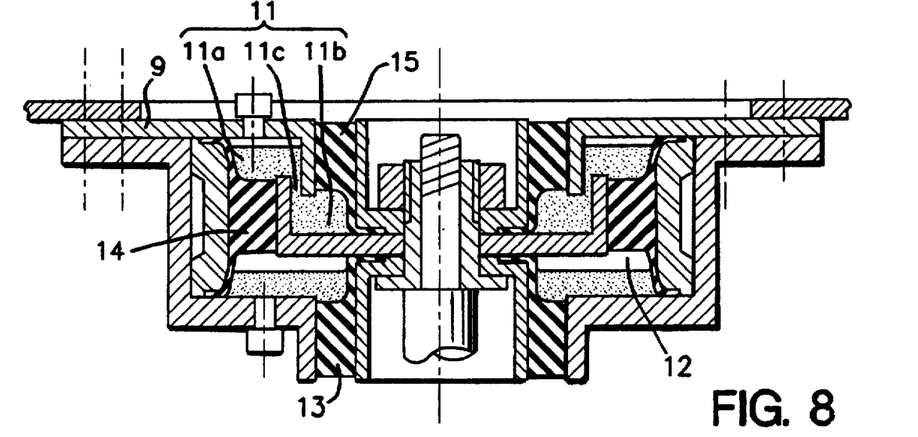
—FIG. 8 illustrates, also in axial section, a variant of the variable elastic coupling assembly in which the device has two non-communicating annular chambers filled with fluid which consists of a viscous liquid in the presence of gas, forming a variable hydropneumatic assembly.

FIG. 8 shows, also in an axial section, a variant of the variable elastic coupling assembly in which the device has two non-communicating annular chambers filled with a fluid which consists of a viscous material in the presence of gas, forming a variable hydropneumatic assembly.

As in the preceding variants, the closed space is divided between an upper annular chamber (11) enclosed in the upper annular armature assembly (AS) and a lower annular chamber (12) enclosed in the lower annular armature assembly (AI). The lower (13), intermediate (14) and upper (15) elastic connecting elements forming the elastomer compound connecting assembly (RE) can include limit stops of the type illustrated in FIGS. 6 and 7, although such stops are not necessary, as shown.

In this variant, the fluid used to fill the closed space consists of a viscous material in the presence of a gas. The modulation of the static and dynamic rigidities is accomplished by the selection of the proportion of the constituents, but an additional damping effect can be obtained by selecting the viscosity of the viscous material and can therefore be modulated as a function of said viscosity. It is apparent, of course, that the agitation of the viscous material in the passage (11c) which connects the upper half-chamber (11a) to the lower half-chamber (11b) of the upper annular chamber (11) and causes a shearing of said viscous material, resulting in a drop in the dynamic rigidity at increasing frequencies, is directly influenced by the viscosity of said material, and by the geometric definition of the passage (11c).

The damping and the gain in dynamic behavior can thus also be modulated.

Figure 9:
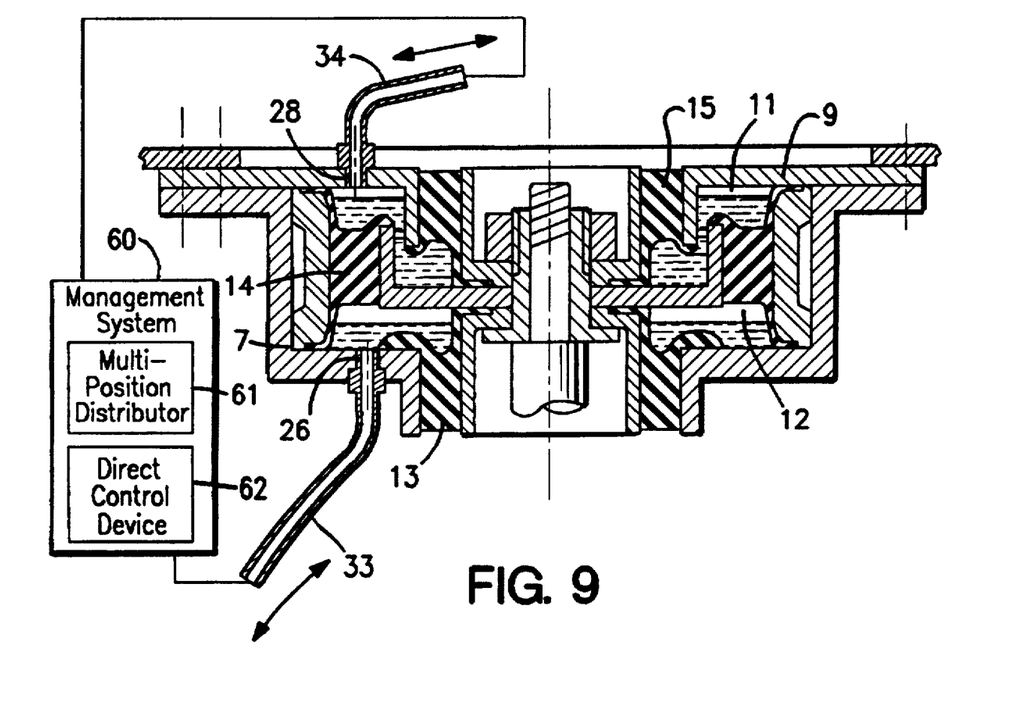
—FIG. 9 shows, also in an axial section, the connection of the annular chambers constituting the closed space to a system which manages the fluid used to fill the closed space in a variable hydroelastic or hydropneumatic elastic coupling assembly.

FIG. 9 shows, also in axial section, the connection of the annular chambers (11, 12) which constitute the closed space to a system (60) for the management of the fluid used to fill the closed space in a variable hydroelastic or hydropneumatic elastic coupling assembly of the invention.

The device has a structure similar to that illustrated in FIG. 1, but is also equipped with connecting channels (33, 34) which make it possible to modulate the composition of the fluid used to fill the closed space. The upper (11) and lower (12) annular chambers are most frequently both connected to the management system (60) for the fluid used to fill the closed space, as shown, but it is apparent that it is also possible for only one of the annular chambers to have such a connection.

The lower connecting channel (33) replaces the plug (27) of the preceding versions to create a communication via the filling orifice (26) through the lower armature (7) between the lower annular chamber (12) and the management system (60) for the fluid used to fill the closed space, and the upper connecting channel (34) replaces the plug (29) to connect the upper annular chamber (11) to the same management system for the fluid used to fill the closed space via the orifice (28) through the upper armature (9). The annular chambers (11, 12) or the connecting channels (33, 34) are equipped with plugging means (not shown) such as non-return valves or devices which perform a similar function, guaranteeing the closure of said annular chambers (11, 12).

The control of the fluid used to fill the closed space has the advantage that it makes it possible to adjust the initial and saturation rigidities of the variable elastic coupling assembly, e.g. to the road profile encountered.

The management system (60) for the fluid used to fill the closed space is therefore most often constituted by a multi-position distributor (61) which makes it possible to select the relative proportions of the components of the fluid used to fill the closed space as a function of the profile of the road surface. In one variant, the variable elastic coupling assembly can become an "active" device, and the management system for the fluid used to fill the closed space becomes a direct pilot control assembly (62) managed as a function of the loads originating either from the shock absorber or from another mechanism participating in the movement to be damped.

Whether or not the management system for the fluid used to fill the closed space is active, the lower (13), intermediate (14) and upper (15) elastic connecting elements can have limit stops, or not, as shown.

Figure 10:
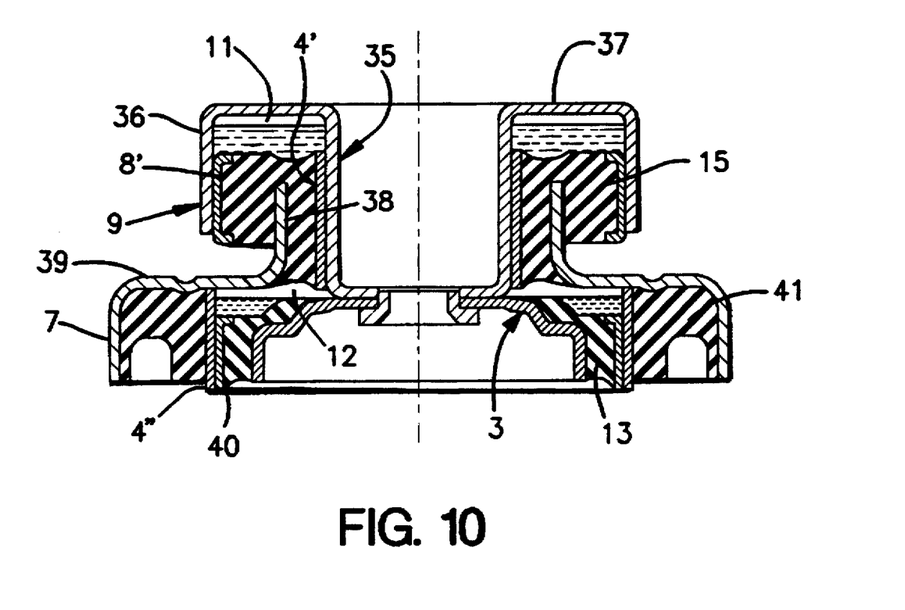
—FIG. 10 is the axial section of a hydropneumatic elastic coupling assembly, the armatures of which have a particular shape.

FIG. 10 illustrates the axial section of a hydropneumatic elastic coupling assembly in which the armatures have a special shape.

In this variant, the upper annular armature assembly (AS) is formed by an upper armature (9), an internal upper connecting armature (4') and an external upper connecting armature (8').

The upper armature (9) has the shape of an inverted W, the internal shaft (35) of which is connected to the periphery (36) by means of an annular zone (37).

The two upper connecting armatures (4', 8') are intimately bonded to the upper elastic connecting element (15) by means of their internal surfaces.

The walls of the upper annular chamber (11) are then formed by the annular zone (37) and the upper part of the internal shaft (35) and of the periphery (36) of the upper armature (9) for the upper part and the flanks, and by the upper surface of the upper elastic connecting element (15) for the lower part.

In this variant, the upper annular chamber (11) does not consist of upper and lower half-chambers, but of a single cavity. Therefore there is no shearing of the liquid by agitation between two half-chambers, and consequently, no reduction of the dynamic rigidity.

The internal (4') and external (8') upper connecting elements are inserted (enclosed?) between the internal surfaces of the periphery (36) and of the internal shaft of the upper armature (9) for the assembly of the device.

The lower annular armature assembly (AI) is formed by an internal lower armature (3), a lower intermediate armature (4") and an S-shaped external armature (7), the upper shaft (38) of which is imbedded in the elastomer compound of which the upper elastic connecting element (15) is made.

The walls of the lower annular chamber (12) are constituted by the portion of the upper elastic connecting element (15) between the upper shaft (38) of the external armature (7) and the internal upper connecting armature (4'), a portion of the horizontal extension (39) of said upper shaft (38) and a lower elastic connecting element (13), intimately bonded to the internal surface of the internal lower armature (3) and to a rigid reinforcement (40) interposed between the lower connecting armature (4") and said lower elastic connecting element (13). Between the horizontal extension (39) of the upper shaft (38) of the external armature (7) and the periphery of the latter, on one hand, and the internal surface of the lower connecting armature (4"), on the other hand, and intimately bonded to them, an external elastic connecting element (41) is inserted, which is also made of elastomer compound and is intended to elastically absorb the loads.

The transmission of the loads is done in a decoupled manner with respect to the fastening to the rod of the shock absorber, which is the only difference between the action of the variable elastic coupling assembly and the preceding variants.

The illustrated device comprises a fluid used to fill the closed space which consists of a liquid and a gas, but it will be apparent to a technician skilled in the art that, depending on the requirements of the specific application, the fluid used to fill the closed space can be gas only, which then results in a variable elastic coupling assembly with a pneumatic action, or liquid only, with a liquid of an appropriate viscosity which produces a hydroelastic version of the device.

FIG. 11 illustrates another special arrangement of the variable elastic coupling assembly, in which is included an external filling element, made of elastomer. The figure does not show the coupling means to the structure to be damped.

The device, like the variants described above, comprises a closed space which consists of an upper annular chamber (11) and a lower annular chamber (12), here shown containing a fluid used to fill the closed space, and which consists of a fluid in the presence of gas.

The walls of the upper annular chamber (11), which consists of a single cavity, are formed by the lower surface of the upper elastic connecting element (15) and by the shoulder (41) of the internal upper armature (5) for the upper portion, by the sealing tab (23) and by the vertical extension (42) of the shoulder (41) of the internal upper armature (5), for the flanks, and by the upper surface of the intermediate elastic connecting element (14) and the upper surface of the external connecting armature (8) for the lower portion.

The upper elastic connecting element (15) is intimately bonded, by means of its lateral surfaces, on one hand to the internal upper armature (5) and on the other hand to a peripheral upper armature (43). The intermediate connecting element (14), for its part, is intimately bonded to an internal coupling armature (4'), and to the external coupling armature (8). It also includes two upper (31) and lower (44) limit stops, both of which are made of elastomer compound.

In this case, the walls of the lower annular chamber (12) are constituted, in the upper portion, by the lower surface of the external coupling armature (8), for the flanks, on one hand by the sealing tab (30) supported by the lower elastic connecting element (13) and on the other hand by the internal vertical shaft (45) of the internal lower armature (3), and for the lower portion, by the upper surface of the lower elastic connecting element (13) and by the horizontal extension (46) of said internal vertical shaft (45).

The lower elastic connecting element (13) is intimately bonded, by its lateral surfaces, on one hand to the leg (47) of the internal lower armature (3) and, on the other hand, to an external lower armature (48).

The device thus constituted also comprises a filling element (50) made of elastomer compound, which is designed to absorb loads. It is fastened to the elastic connecting device by fastening means (51) which make possible the assembly of the lower peripheral armature (49), to which the filling element (50) is intimately bonded, both on the upper and lower external armatures (43, 48) and on the external connecting armature (8).

The operation of this variant of the variable elastic coupling assembly is similar to that described by the curve (H) in FIG. 5. The upper (31) and lower (44) limit stops supported by the intermediate elastic connecting element (14), in the event of a rebound or impact, come into contact with the stops on the internal surfaces respectively of the shoulder (41) of the internal upper armature (5) or of the horizontal extension (46) of the internal vertical shaft (45) of the internal lower armature (3).

FIG. 12 illustrates an additional variant of the variable elastic coupling assembly, in a hydropneumatic version, in which the fluid used to fill the closed space contains a high proportion of liquid.

The closed space of this device is made up of two annular chambers (11, 12), each comprising two half-chambers, the upper (11a) and lower (11b), for the upper annular chamber (11), and two internal (12i) and external (12e) half-chambers for the lower annular chamber (12).

The separation between the two half-chambers of each of the annular chambers (11, 12) is realized in this case by a particular arrangement of the intermediate elastic connecting element (14), in which is embedded the bent leg (52) of the internal connecting armature (4), as well as the vertical leg (53) of the external connecting armature (8), and which comprises two upper (31) and lower (44) limit stops.

The upper surface of the lower elastic connecting element (13) and the lower surface of the intermediate elastic connecting element (14) define the lower annular chamber (12), with the internal surfaces of the internal lower armature (3), the lower armature (7) and the lower external surface of the horizontal leg (54) of the internal connecting armature (4).

In a similar manner, the lower surface of the upper elastic connecting element (15) and the upper surface of the intermediate elastic connecting element (14) define the upper annular chamber (11), with the internal surfaces of the internal upper armature (5), the upper armature (9), the upper surface of the external connecting armature (8) and the upper surface of the horizontal leg (54) of the internal connecting armature (4).

The connection between the lower annular armature assembly (AI) and the upper annular armature assembly (AS) is realized on one hand by means of the extremity (41) of the internal connecting armature (4) which is enclosed between the lower surface of the horizontal extremity (5h) of the internal upper armature (5) and the upper surface of the horizontal extremity (3h) of the internal lower armature (3), and on the other hand, by the extremity (8e) of the external connecting armature (8) which is enclosed between the lower surface of the horizontal extremity (9h) of the upper armature (9) and the upper surface of the horizontal extremity (7h) of the lower armature (7).

In the illustrated variant, the composition of the fluid used to fill the closed space is different from one annular chamber to the other. In the upper annular chamber (11), the fluid used to fill the closed space consists of approximately 90% liquid and 10% gas, while in the lower annular chamber (12), the proportion of liquid is approximately 80%. This difference makes it possible, in operation, to have an asymmetrical regulation of the action of the variable elastic connecting assembly.

FIG. 13 illustrates a simplified variant of the variable elastic coupling assembly in a hydropneumatic version, in which the closed space is comprised of a single annular chamber.

This simplification obviously results in decreased efficiency, but may be necessary for the realization of a device at a lower cost if the operating requirements are less demanding.

The existence of a single annular chamber (55) makes it possible to reduce the number of components, the elastomer compound connecting assembly (RE) being constituted only by the upper (15) and lower (13) elastic connecting elements, installed respectively between the external surface of the vertical leg (5v) of the internal lower armature (5) and the upper surface of the upper armature (9) on one hand, and between the internal surfaces of the vertical leg (3v) of the internal lower armature (3), by an upper peripheral armature (56) equipped with borings (57) to make assembly possible, and by the internal armature (7). The device also has an additional elastic connecting element (58).

The single annular chamber (55) contains a fluid, which in this case consists of approximately 70% liquid and 30% gas, and is used to fill the closed space.

The illustrated variant has a single annular chamber (55) located in the upper portion of the device, and which is consequently more efficient in the case of ascending movements of the rod of the shock absorber, i.e. in an impact load, but it will be apparent to a technician skilled in the art that if priority is to be given to the damping of rebound loads, the device would be designed so that the single annular chamber (55) is located in the lower portion of the device.

The fabrication process for the present invention consists of molding employing the conventional means used in the rubber transformation industry, after a prior treatment of the armatures so that they can be made to adhere to the elastic connecting elements constituting the elastomer compound connecting element (RE). For this purpose, the various armatures are given a degreasing treatment and an enduction by a priming coat, followed by a layer of adhesive agent.

The armatures and the elastomer compounds which make up the elastic connecting elements are then placed in the cavity of an appropriate mold, which is then closed and placed under a press. Under the influence of the pressure and the temperature, the elastomer compounds are simultaneously cross-linked, and are made to adhere to the armatures.

When it has cooled, the device is removed from the mold, and proceeds to the phase in which the closed space is filled, after which any finishing operations which may be necessary are performed. The variable elastic connecting element is then ready to be shipped to the automobile manufacturer to be installed on the vehicle.

Compared to the devices of the prior art, the variable elastic coupling device of the invention has the advantage that it makes it possible to vary the characteristics by means of a partly independent modulation of the static rigidity, of the static rigidity, of the dynamic rigidity and gain, a modulation of the damping effect, a limitation of the deflections without mechanical contact, the possibility of controlling the composition of the fluid used to fill the closed space, a control which can be exercised directly by the loads of the shock absorber, thereby resulting in an active elastic coupling system.

All of the measures described above show the extent of the range of possibilities of modulating the static and dynamic characteristics available to the designer to optimize the variable elastic coupling assembly as a function of the specifications written by the automobile manufacturers.

The advantage of this invention also lies in the fact that its effects are achieved without contact between mechanical elements such as those of conventional systems, which are frequently the origin of excessive noise on account of the phenomena of mechanical friction and jamming.

Finally, the device claimed by the invention also has the advantage that it is insensitive to the skewing or diagonal position induced by the rod of the shock absorber, and in this case, retains the same force-deflection ratio, which is not the case with the conventional devices.

A technician skilled in the art will be able to modify the relative layout of the component elements and to device various geometrical variants of the variable elastic coupling assembly of the invention without going beyond the content of the invention.

One feature of the invention resides broadly in the variable elastic coupling assembly, forming an attachment of the shock absorber and a filtering block between the rod 6 of a vehicle shock absorber 1 and a structure to be damped 2, constituted by rigid annular armatures intimately bonded to a an elastomer compound connecting assembly RE to delimit a closed space containing a fluid used to fill the closed space, said variable elastic coupling assembly being rigidly fastened on one hand to the rod 6 of the shock absorber by means of an internal lower armature 3 and an internal upper armature 5, and on the other hand to the structure to be damped 2 by means of at least one upper armature 9, the variable elastic coupling assembly being characterized by the fact that the closed space is delimited by an upper annular armature assembly AS and/or a lower annular armature assembly AI which is totally sealed with respect to its external environment by means of the installation of a plug 27, 29 after filling, and by the fact that a modulation of the static and dynamic characteristics of said variable elastic coupling assembly is obtained by varying the composition of the fluid used to fill the closed space and/or of the volume of said closed space which, by cooperating with the elastomer compound connecting assembly RE, makes it possible on one hand to adapt the relative displacements of the components of the upper AS and lower AI annular armature assemblies, as well as said elastomer compound connecting assembly RE, and on the other hand to filter the vibrations as a function of the requirements for a gradual nature of the damping.

Another feature of the invention resides broadly in the variable elastic coupling assembly characterized by the fact that the closed space is constituted by a single annular chamber 55 filled with a fluid which cooperates with the elastomer compound connecting assembly RE to filter the vibrations due to the ascending or descending movements of the rod 6 of the shock absorber 1, depending on whether it is located in the upper or lower portion of said variable elastic coupling assembly, the vibrations due to the opposite direction then being filtered by the elastomer compound connecting assembly RE constituted by the lower 13, upper 15 and additional 58 elastic connecting elements.

Yet another feature of the invention resides broadly in the variable elastic coupling assembly characterized by the fact that the closed space is constituted by two non-communicating annular chambers 11, 12, containing a fluid used to fill the closed space and defined by an upper annular armature assembly AS and a lower annular armature assembly AI, the upper annular chamber 11 cooperating with upper 15 and intermediate 14 elastic connecting elements to filter the vibrations due to the impact loads, the lower annular chamber 12 cooperating with the same intermediate elastic connecting element 14 and a lower elastic connecting element 13 to filter the vibrations due to the rebound loads.

Still another feature of the invention resides broadly in the variable elastic coupling assembly characterized by the fact that the fluid used to fill the closed space is constituted by a gas which makes it possible to realize a pneumatic variable elastic coupling assembly.

A further feature of the invention resides broadly in the variable elastic coupling assembly characterized by the fact that the fluid used to fill the closed space is constituted by a liquid which makes it possible to realize a hydroelastic variable elastic coupling assembly.

Another feature of the invention resides broadly in the variable elastic coupling assembly characterized by the fact that the fluid used to fill the closed space is constituted by a liquid in the presence of a gas, the relative proportions of which make it possible to modulate the static and dynamic rigidities of said variable elastic coupling assembly, making it possible to realize a variable hydropneumatic elastic coupling assembly.

Yet another feature of the invention resides broadly in the variable elastic coupling assembly characterized by the fact that the fluid used to fill the closed space comprises a liquid constituted by at least two components, miscible or immiscible, of different viscosities, making it possible to modulate an additional damping action.

Still another feature of the invention resides broadly in the variable elastic coupling assembly characterized by the fact that the fluid used to fill the closed space comprises at lest one viscous material, the viscosity of which makes it possible to modulate a damping action which is added to the vibration filtering action.

A further feature of the invention resides broadly in the variable elastic coupling assembly characterized by the fact that at least one of the lower 13, intermediate 14 or upper 15 elastic connecting actions comprises at least one limit stop 30, 31, 32, 44 made of elastomer compound, which acts in the case of rebounds or impacts as a stroke limiting contact which provides additional dynamic saturation.

Another feature of the invention resides broadly in the variable elastic coupling assembly characterized by the fact that the closed space is connected to a management system for the fluid used to fill the closed space, making it possible to modulate the static and dynamic rigidities as a function of the road surface, by means of at least one connecting channel 33, 34 emptying into at least one of the annular chambers 11, 12 via a filling orifice 26, 28 provided in at least one of the upper 9 or lower 7 armatures.

Yet another feature of the invention resides broadly in the variable elastic coupling assembly characterized by the fact that the management system (60) for the fluid used to fill the closed space is constituted by a multi-position distributor (61).

Still another feature of the invention resides broadly in the variable elastic coupling assembly characterized by the fact that the fluid management system is constituted by a direct control device (62) managed as a function of the loads generated by the shock absorber or of another mechanism participating in the movements to be damped, thereby constituting an active variable elastic connecting assembly.

All, or substantially all, of the components and methods of the various embodiments may be used with at least one embodiment or all of the embodiments, if more than one embodiment is described herein.

The invention as described hereinabove in the context of the preferred embodiments is not to be taken as limited to all of the provided details thereof, since modifications and variations thereof may be made without departing from the spirit and scope of the invention.

What is claimed is:

1. A variable elastic coupling assembly interconnecting a rod of a vehicle shock absorber and a structure to be damped in order to filter vibrations, said assembly comprising two rigid annular armatures one of which is fastened to the rod and the other to the structure, said armatures being bonded together through three elastomeric annular elements including an upper elastomeric annular element, an intermediate elastomeric annular element, and a lower elastomeric annular element, which delimit between them a closed space containing a fluid, at least one of the lower, intermediate and upper elastomeric annular elements comprising at least one limit stop of elastomer, the volume of said closed space being modified by deformation under strain of said elastomeric annular elements, said closed space being totally sealed with respect to its external environment, and being constituted by two non-communicating annular chambers including an upper annular chamber, delimited by the upper elastomeric annular element and the intermediate elastomeric annular element, for filtering vibrations due to impact loads, and a lower annular chamber, delimited by the same intermediate elastomeric annular element and the lower elastomeric annular element, for filtering vibrations due to rebound loads, said closed space being connected to a management system for the fluid used to fill the closed space, making it possible to modulate the static and dynamic rigidities as a function of the road surface, by means of at least one connecting channel emptying into at least one of the annular chambers via a filling orifice provided in at least one of the armatures, and said fluid including a gas phase and at least one liquid phase.

2. The assembly as claimed in claim 1, wherein the liquid phase contained in the closed space comprises at least two components of different viscosities.

3. The assembly as claimed in claim 1, wherein the liquid phase contained in the closed space comprises at least one viscous material.

4. The assembly as claimed in claim 1, wherein the management system for the fluid used to fill the closed space comprises a multi-positioned distributor.

5. The assembly as claimed in claim 1, wherein the fluid management system comprises a direct control device managed as a function of loads generated by the shock absorber, thereby to provide an active variable elastic connecting assembly.

6. A variable elastic coupling assembly interconnecting a rod of a vehicle shock absorber and a structure to be damped in order to filter vibrations, said assembly comprising two rigid annular armatures one of which is fastened to the rod and the other to the structure, said armatures being bonded together through three spaced elastomeric annular elements, said armatures and elastomeric annular elements defining a closed space comprised of two closed annular chambers sealed from each other and containing a fluid, the volume of said closed space being modified by deformation under strain of said elastomeric annular elements, said closed space being totally sealed with respect to its external environment, said fluid including a gas phase and at least one liquid phase, said annular chambers being subdivided into two smaller annular chambers that communicate with each other only through a narrow annular space.

7. The assembly as claimed in claim 6, wherein the chamber, which is subdivided into two smaller chambers, contains a viscous liquid phase, said liquid phase being subject to shear when passing through said narrow annular space.

* * * * *